United States Patent [19]

Quinn

[11] Patent Number: 5,775,915

[45] Date of Patent: Jul. 7, 1998

[54] FORM OF MUSIC NOTATION

[76] Inventor: Beris Ivy Quinn, 138 Ellesmere Road, Gymea Bay, New South Wales, Australia, 2227

[21] Appl. No.: 581,630

[22] PCT Filed: May 15, 1995

[86] PCT No.: PCT/AU95/00275

§ 371 Date: Jan. 18, 1996

§ 102(e) Date: Jan. 18, 1996

[87] PCT Pub. No.: WO95/32495

PCT Pub. Date: Nov. 30, 1995

[30] Foreign Application Priority Data

May 24, 1994 [AU] Australia .................. PM5807

[51] Int. Cl.[6] .................. G09B 19/00; G09B 15/02
[52] U.S. Cl. .................. 434/156; 84/483.2; 84/471 R
[58] Field of Search .................. 84/483.1, 483.2, 84/470, 470 P, 471 R, 471 SR, 471 VL, 476, 479, 479 A, 485 R; 434/156

[56] References Cited

U.S. PATENT DOCUMENTS

| 6,528 | 6/1849 | Von Heeringen | 84/483.2 |
| 122,096 | 12/1871 | Acee | 84/483.1 |

*Primary Examiner*—Richard J. Apley
*Assistant Examiner*—John Edmund Rovnak
*Attorney, Agent, or Firm*—Jacobson & Johnson

[57] ABSTRACT

There is a musical score in which the key and any accidentals are indicated by visual coding of the individual notes and associated components as they appear throughout said score. The visual coding includes a set of contrasting colors. One of the set is applied to those individual notes (r) inflected with a sharp and another of said set being applied to those individual notes (g) inflected with a flat. Changes to the bass or treble clef are indicated with lines 24(R), 25(C) in contrasting colors of said set.

2 Claims, 13 Drawing Sheets

R – RED
G – GREEN

FORM OF MUSIC NOTATION

BACKGROUND OF THE INVENTION

This invention relates to an improved form of musical score which assists in the teaching of students to read music and to play instruments with greater accuracy.

In conventional music scores the hey signature is placed at the beginning of each staff so that the student has to play without further prompting the necessary sharps and flats as required through the piece. Variations from the specified key are indicated by accidentals adjacent to particular notes. Such existing presentation results in considerable visual clutter especially where there is a large number of accidentals. Moreover, it has been estimated that only those students with abilities in about the top 5% are able to easily follow a key signature throughout a composition without error.

SUMMARY OF THE INVENTION

It is therefore an object of this invention to eliminate the aforementioned disadvantage and accordingly a musical score is disclosed in which the key and any accidentals are indicated by colour or other visual coding at specific individual notes and associated components as they appear throughout the composition.

Preferably said individual notes are coded by printing the heads thereof in contrasting colours in accordance with whether they are inflected with a sharp or flat.

Alternatively the visual coding may be obtained by altering the shape of the noting heads.

DESCRIPTION OF THE PREFERRED EMBODIMENTS

The invention in its currently preferred forms will now be described with reference to the following figures in which the letter "G" indicates notes or associated components coloured green and the letter "g" indicates such items as coloured red.

Figure 1A:
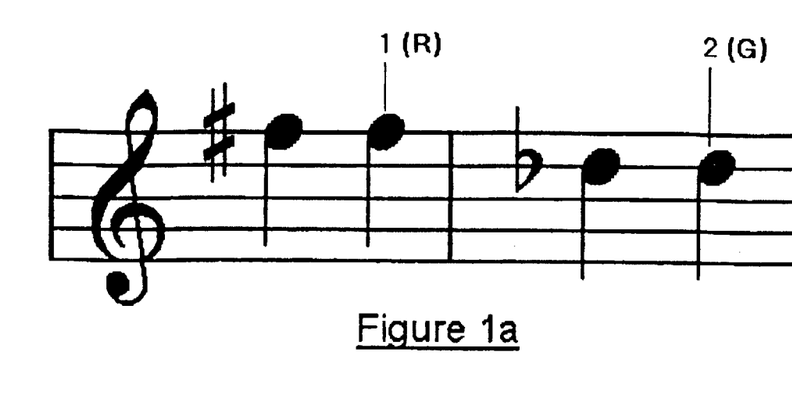
FIGS. 1a and 1b show the conventional prior art method of writing crotchets, minims and semibraves.

FIG. 1a illustrates the conventional method of writing F♯ and D♭ in crotchets, or any other filled in note e.g. quaver etc. Alongsido is a preferred method according to the invention where colour is used to indicate that these notes 1 and 2 are on the black keys, rod indicating a semitone to the right of the note, and green a semitone to the left of the noise, thus eliminating accidentals.

Figure 1B:
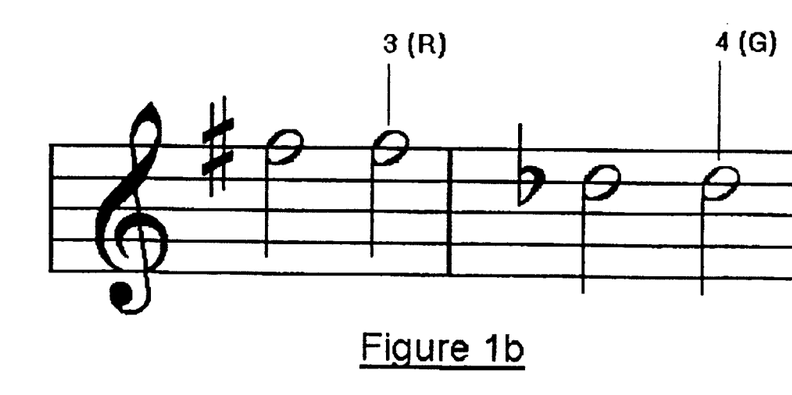

FIG. 1b illustrates the conventional method of writing F♯ and D♭ as minims, or semibreves. Alongside is shown the preferred method according to this invention where colour is used to indicate that these notes 3 and 4 are on the black keys: red indicating a semitone to the right of the note, green a semitone to the left of the note, thus eliminating accidentals.

Figures 2A, 2B:
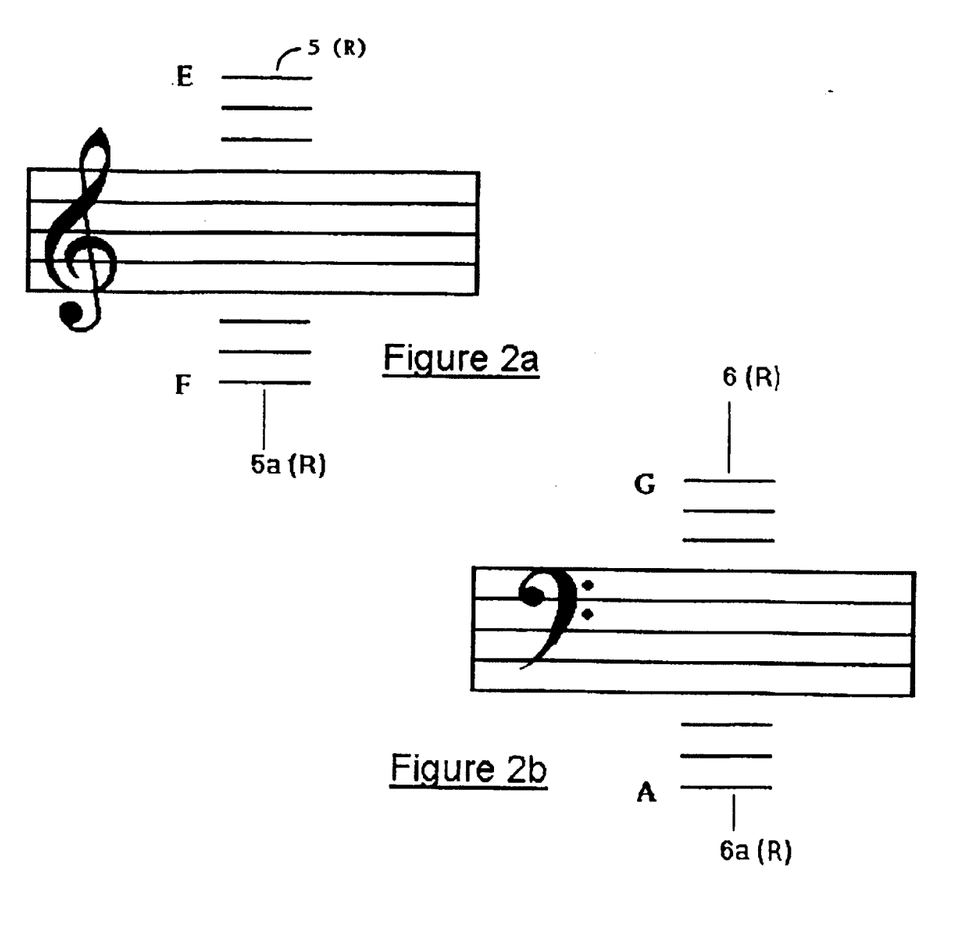
FIGs. 2a to 2c show guidelines which may be used to facilitate note reading.
Figure 2C:
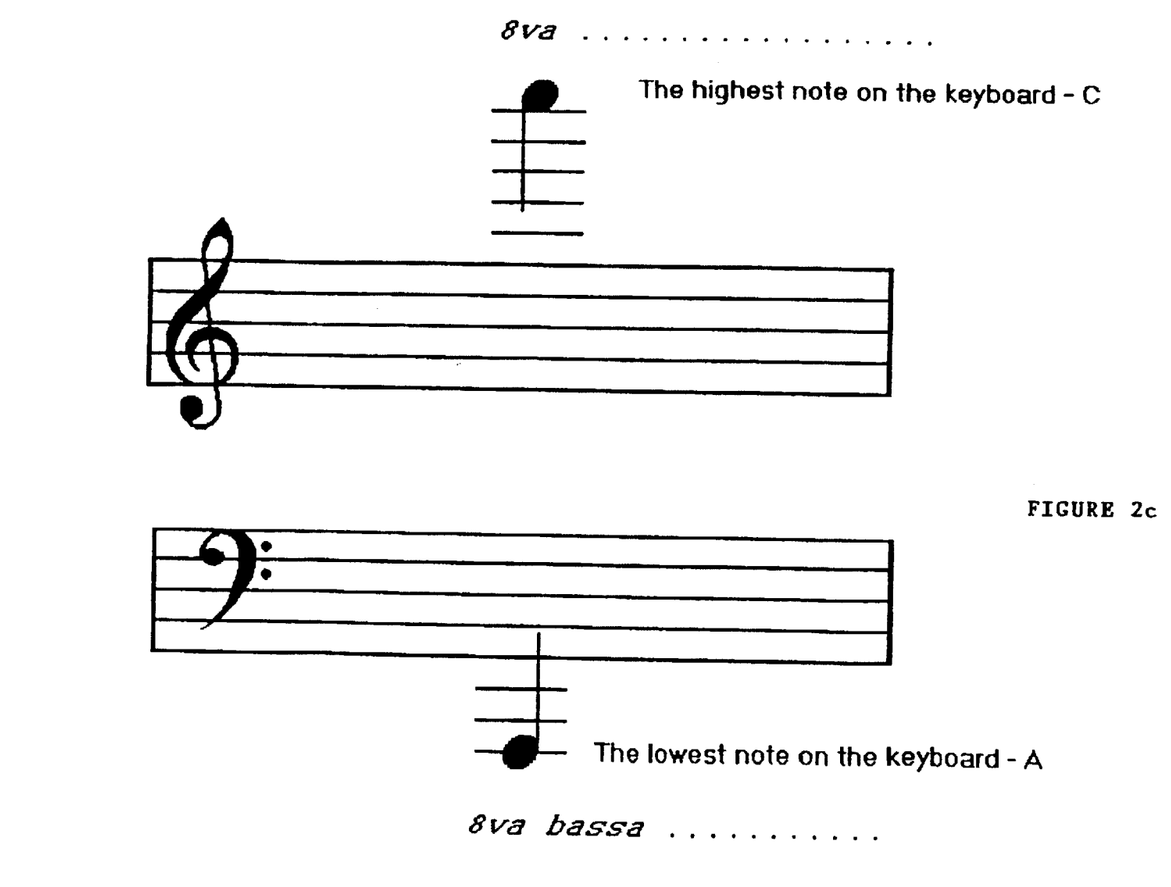

FIG. 2a shows a guideline which may be coloured red to facilitate the reading of notes above or below the tremble staff. The third line 5 above the treble clef name E as a reference point relating to the first line E of the standard treble clef E G B D F. The third line 5a below the treble relates to the first spats of treble clef F A C E. These lines and spaces are very familiar to music students as they form the basic treble staff.

FIG. 2b shows a guideline which may be coloured red according to this invention above and below the bass stuff. The third line 6 above uses G as a reference point relating to the first line G in the bass clef G B D F A. The third line 6a below relates to A the first space in the bass clef. A C E G. These lines and spacer are very familiar to music students as they form the basic bass staffs.

With conventional music notation the excessive number of leger lines often used to illustrate the highest and lowest notes on the keyboard can easily be dispensed with by the use of the octave sign, 8va . . . . above the treble clef, which tells the student or performer to play the written notes one octave higher. The same sign or 8va bassa . . . . can be used in the bass clef and means that the notes are to be played on octave lower than written.

In accordance with this invention a red coloured line may divide the essential leger lines so that with the octave signs the (performer) student only has to identify a maximum of two leger lines above or below this reference point in both treble and bass clefs.

Figure 3:
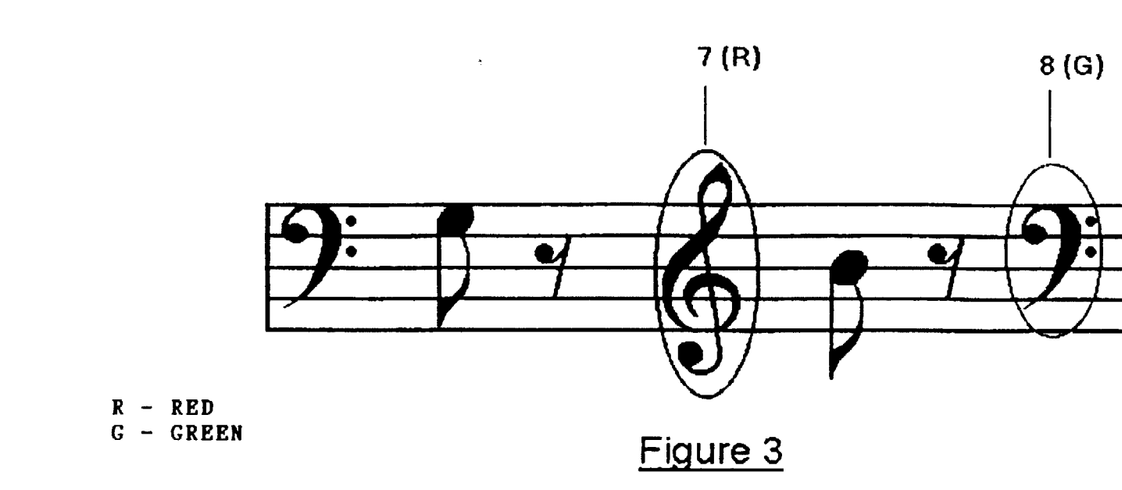
FIG. 3 shows the preferred method of highlighting changes of clef according to this invention.

FIG. 3 illustrates the preferred method according to this invention of highlighting changes of clef to alert a student to altered tonality. With this example a red coloured line 7 is placed around the treble clef and a green coloured line 8 is placed around the bass clef.

Figure 4:
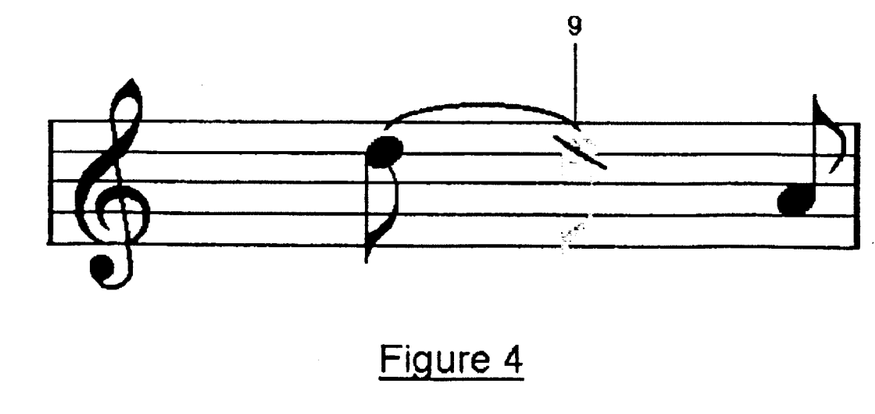
FIG. 4 shows the preferred method of indicating ties according to this invention.

FIG. 4 is the preferred method according to this invention of indicating ties where the second note is not repeated but is held for its full value. This avoids unnecessary repetition and also confusion between a tie and a slur which are identical. The tied note 9 is preferably written in grey with a diagonal stroke.

Figure 5A:
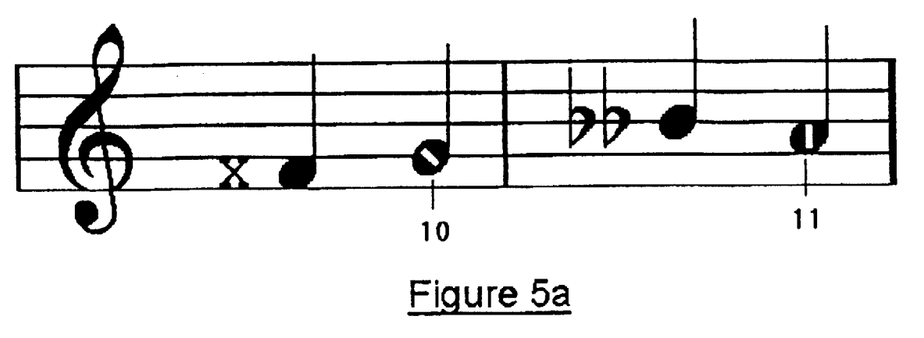
FIG. 5a shows the preferred method of writing notes inflected with double sharps and flats according to this invention.

FIG. 5a illustrate the preferred method according to this invention of writing notes inflected with double sharps and double flats as the actual note on the keyboard. For example F double sharp is written as C and B double flat in written as A. For analytical purposes it is further preferred to indicate the double sharp as a diagonal line 10 in white when the inflected note is a crotchet, quaver etc. (filled in black note). Similarly it is preferred to indicate the double flat as a vertical white line 11 when the inflected note is a crotchet, quaver, etc.

Figure 5B:
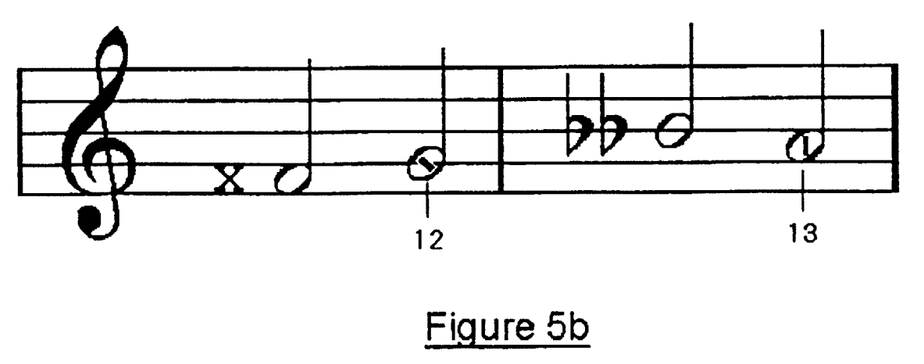
FIG. 5b, 5c and 5d show the preferred methods of writing a double sharp or flat as minims or open notes according to this invention.

FIG. 5b shows the currently preferred method for analytical purposes of writing the double sharp and double flat as minimum or open notes. In this case the diagonal line 12 for the double sharp and the vertical line 13 for the double flat will be black.

Figure 5C:
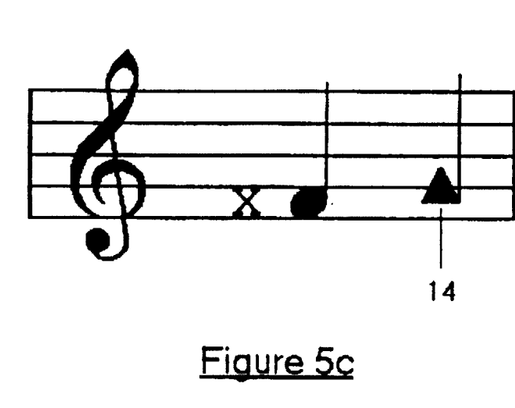
Figure 5D:
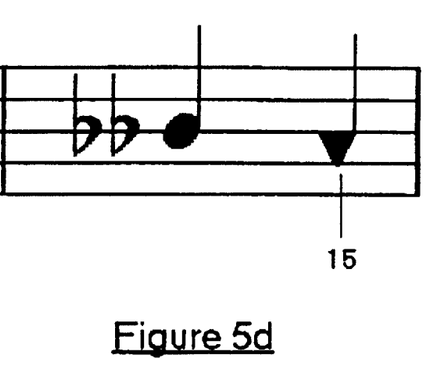

Alternatively the double sharp or flat may be represented as a triangular note head 14 with the apex pointing upward (FIG. 5c) or downward 15 (FIG. 5d) respectively.

There are two sharps which occur on the white keys of the keyboard, being

E♯ which is the actual note F; and

B♯ which is the actual note C.

There are also two flats which occur on the white notes, being

F♭ which is the actual note E; and

C♭ which is the actual note B.

Figure 6A:
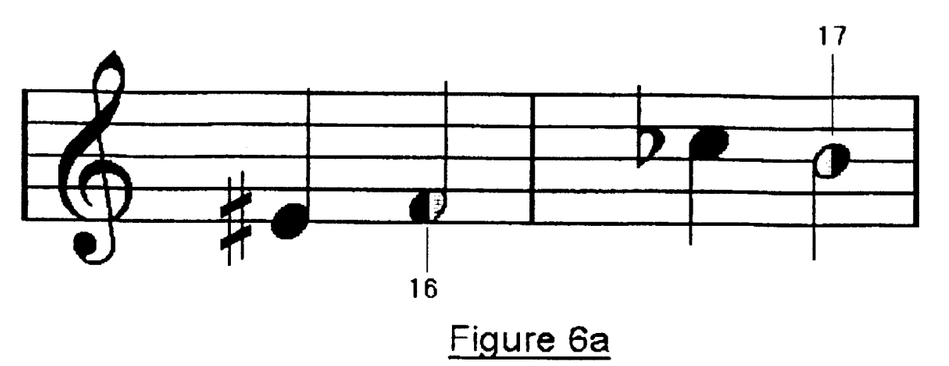
FIGS. 6a, 6b, 6c and 6d show the preferred methods of writing certain sharps and flats as the actual note to be played according to this invention.
Figure 6B:
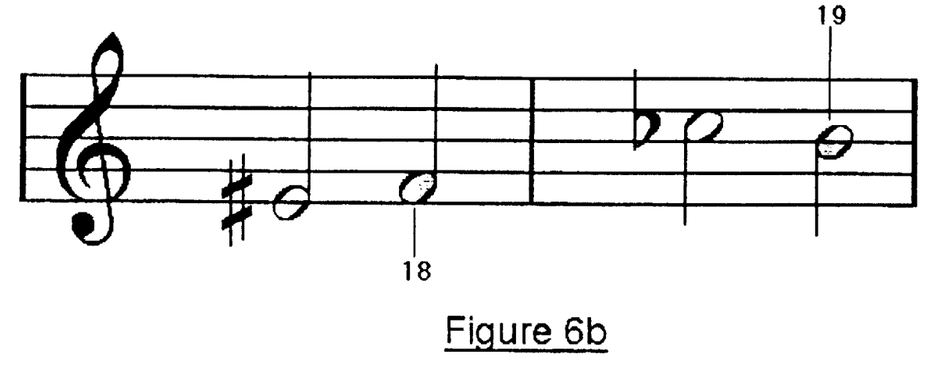

As shown in FIGS. 6a and 6b it is preferred in accordance with this invention to write these notes 16, 17, 18 and 19 as the actual notes to be played and to indicate their origin by shading the right side in grey to shown that the note has been moved to the right in the case of sharps and by shading the left side in grey to show that the note has been moved to the left in the case of the flats.

Figure 6C:
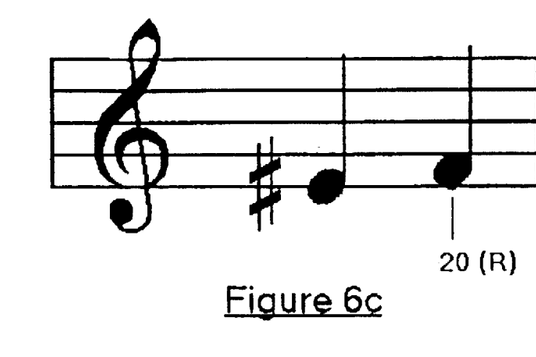
Figure 6D:
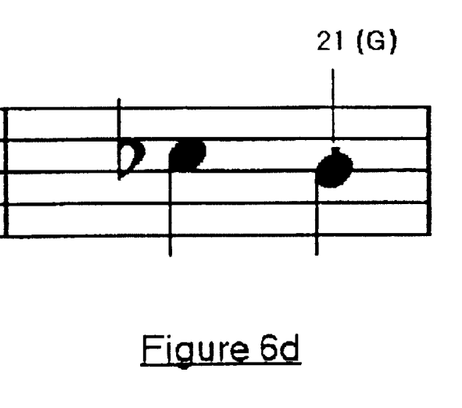

Alternatively as shown in FIGS. 6c and 6d the actual note may be printed with the addition of a small tag of colour on the note head. For example a red dot 20 underneath the note head may be used for sharps and a green dot 21 above the note head for flats so as to indicate the original inflected nots.

For instruments other than keyboard e.g. strings, wind etc. the notation shown in FIGS. 6a and 6b would not apply as there would not be the problem of the black and white key pattern. In this case E♯ would preferably be written as a red H B♯ would preferably be written as a red B F♭ would preferably be written as a green f; and C♭ would preferably be written as a green C.

Figure 7A:
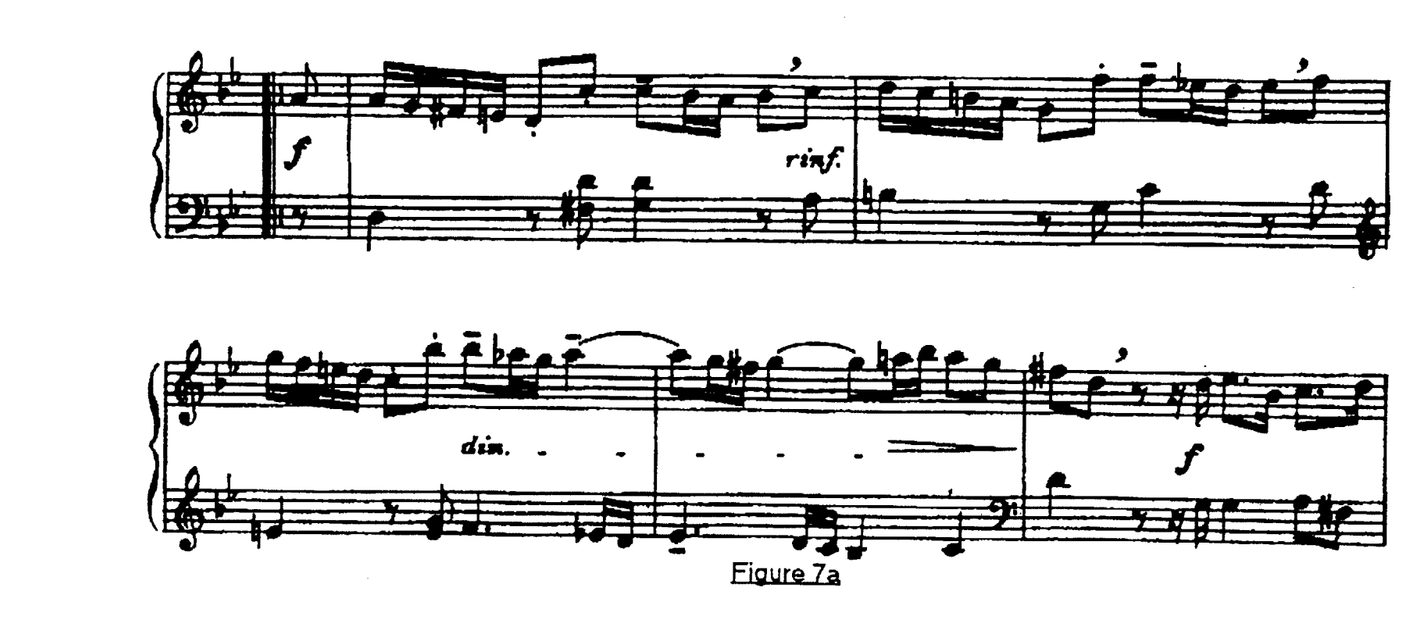
FIG. 7a shows a score presented in conventional prior art fashion.

FIG. 7a shows part of a score (Ailemande) presented in conventional prior art fashion. The key signature as the beginning of each staff shows B♭ and E♭. In addition there are sharp and natural accidentals appearing adjacent to various individual notes throughout the composition. For most students such presentation is difficult if not confusing due to the visual clutter and also the necessity of picking up each B♭ and E♭ of the key signature without further prompting.

Figure 7B:
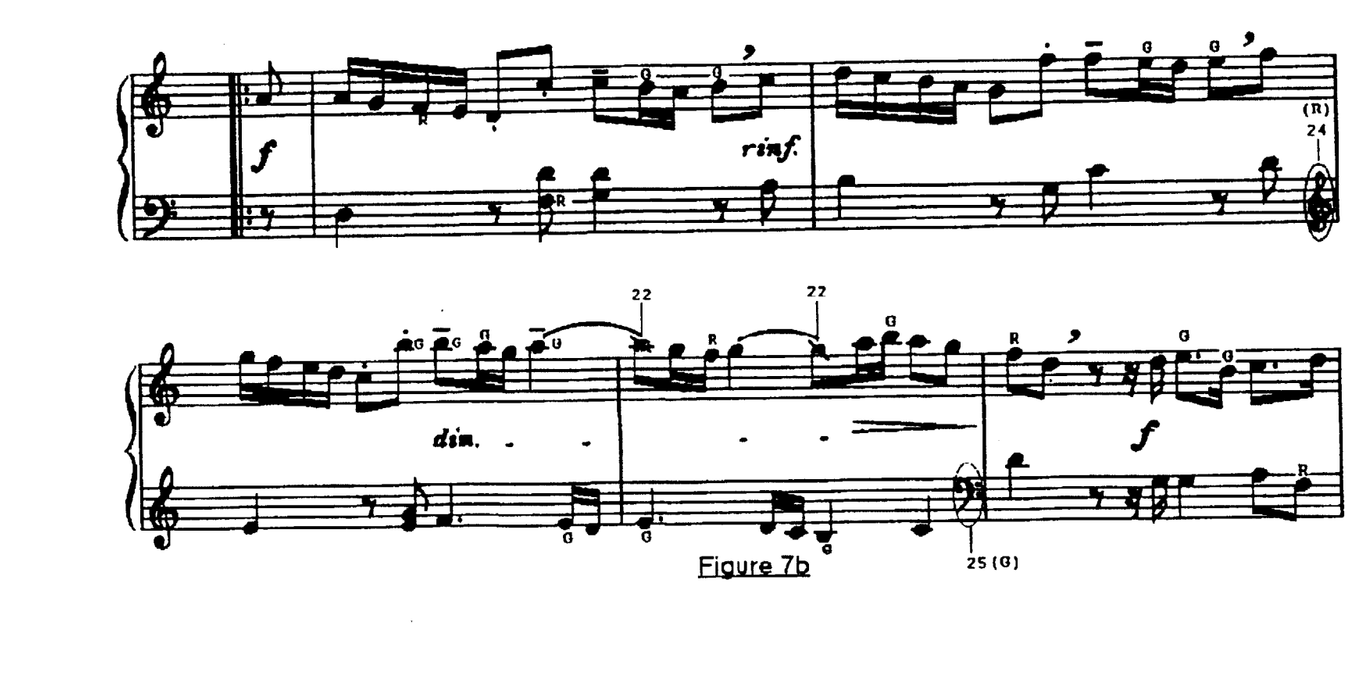
FIG. 7b shows the score of FIG. 7a printed in accordance with the present invention.

In FIG. 7b this same score is printed in accordance with the present invention. The notes B♭ and E♭ are colour coded green in place of the key signature and A flat accidentals are also coloured green. Notes F♯ are colour coded red in place of the sharp accidentals. Ties 22 are distinctly shaded lighter with a diagonal stroke through to show this note is not to be played again. This novel arrangement produces a remarkably easy to read score in which all sharps and flats are immediately recognisable even to beginners or students of limited ability. The emission of accidentals throughout also reduces visual clutter.

Figure 8A:
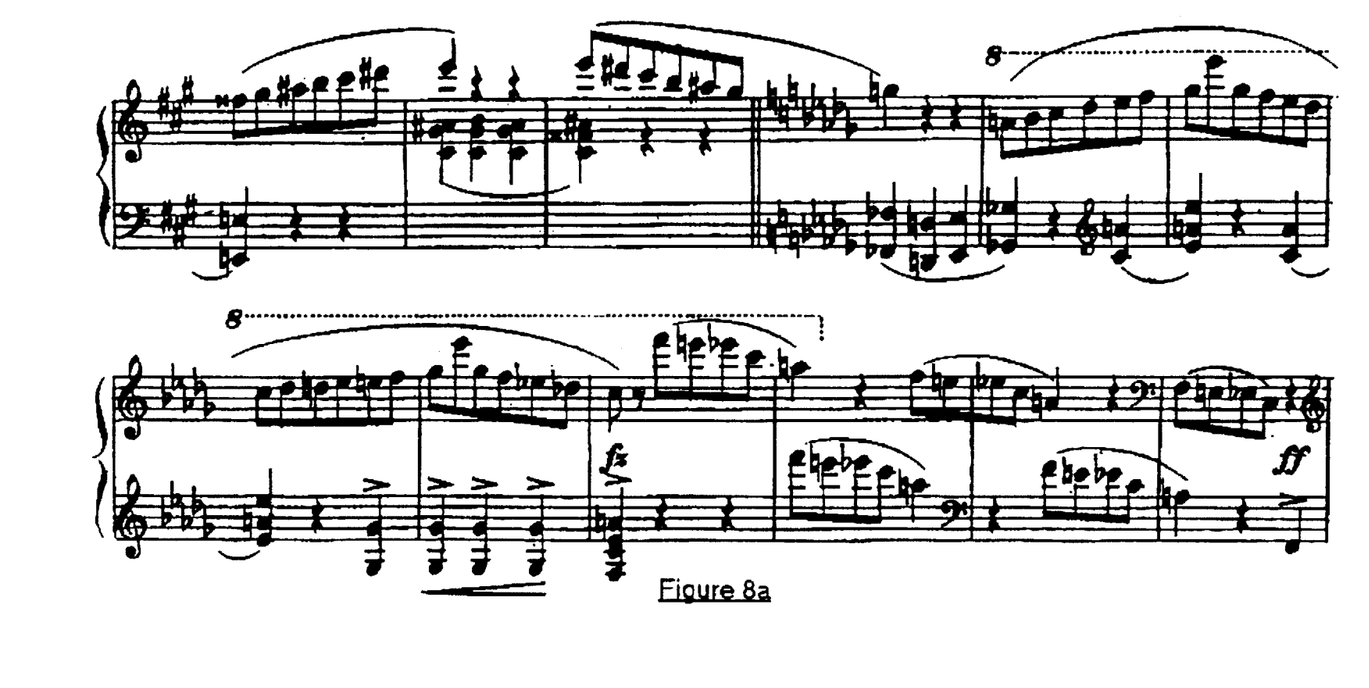
FIG. 8a shows another score presented in conventional prior art fashion.

FIG. 8a as a second example shows a portion of a score (Schergo by Chopin) presented in conventional prior art fashion.

Figure 8B:
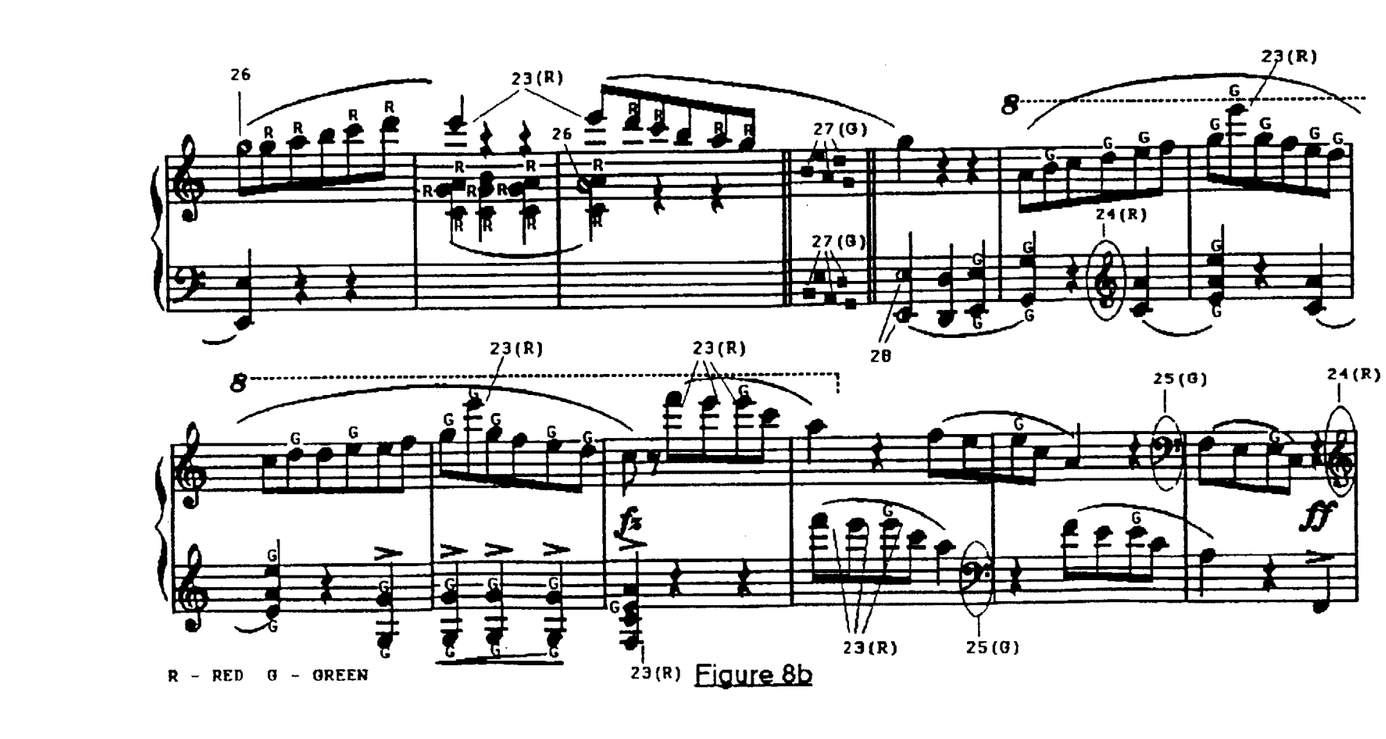
FIG. 8b shows the score of FIG. 8a printed in accordance with this invention.

FIG. 8b shows this same portions printed in accordance with the present invention. In this case the third leger line highlight 23 is used to show a reference point above and below both the treble and bass staffs. In the treble clef the highlight appears on the third leger line above the staff indicting the position of E, and the third line below indicating the position of F. Correspondingly in the bass clef indicating the position G and A on the third line above and below respectively.

Changes in clef occurring throughout the piece are indicated by a red coloured line 24 around the treble clef and a green line 25 around the bass clef.

Double sharps and double flats are indicated as the actual note (e.g. E double sharp equals G). Preferably this is indicated by a white diagonal line 26 in a filled in black note e.g. crotchet, and a black diagonal line in an open note e.g. minim. The double flat is indicated with a white vertical line in a filled in black note and a black vertical line in an open note (as appearing in FIGS. 5a and 5b).

Where notes are tied, indicating that the subsequent note is not to be sounded (as appearing in FIG. 7b), a plane shade is preferably used for the tied note with a diagonal line through the note head.

As shown in FIG. 8b the tonality of a piece will also be preferably shown at the beginning or at specified key changes by coloured squares 27 to replace a given key signature.

Figure 7C:
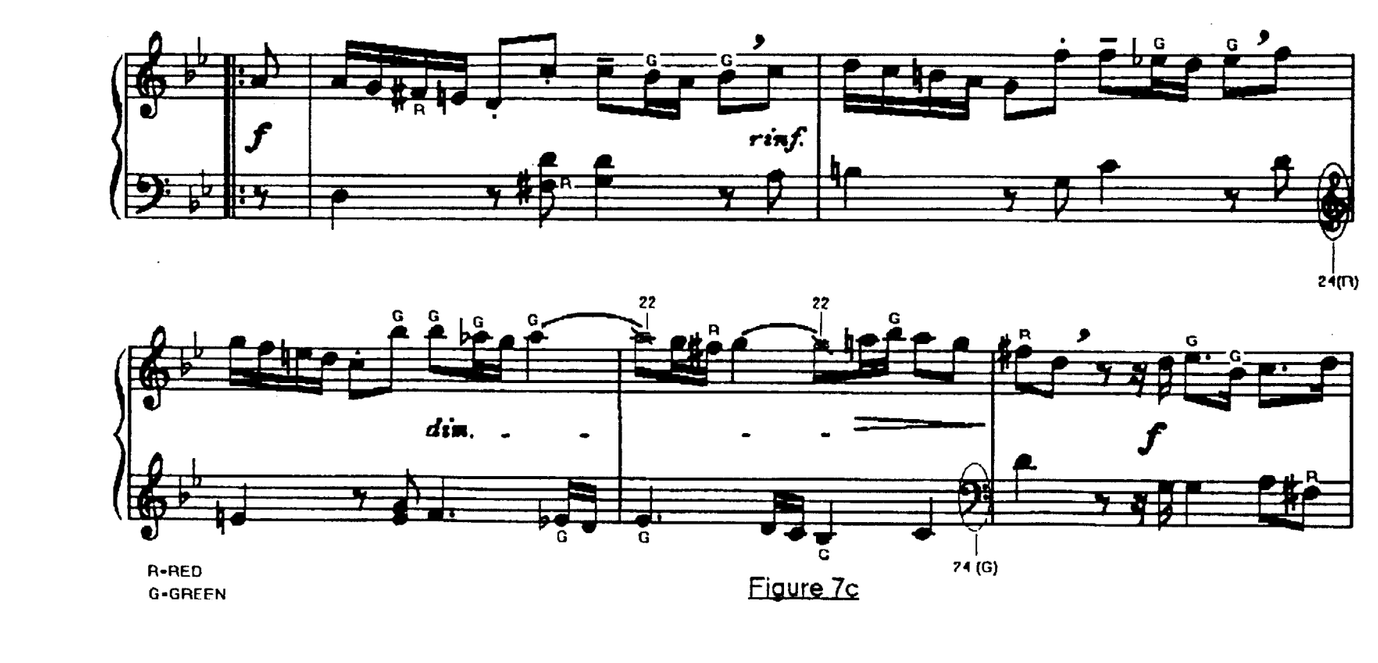
FIG. 7c shows a transitional form of score

To facilitate the transition from the current system of musical score to the proposed method an intermediate step would preferably be implemented. The key signatures and accidentals would be maintained and the inflected notes (sharps and flats) would be coloured red and green respectively in accordance with this invention. In this intermediate form E♯, B♯, F♭ and C♭ flat would remain in their original form, e.g. E♯ would be written as a black note preceded by a sharp (FIG. 7c).

In accordance with a further embodiment of this invention there is also the option of having the key signature and all accidentals in one colour only. For example if a piece has a key signature of three flats—B♭, E♭ and A♭ and made use of some sharp accidentals throughout, these accidentals could be written enharmonically as flats, e. g. F♯ (a red F) would be written as G♭ (a green G). The reverse would apply in a piece which had a key signature of three sharps and used flat accidentals throughout.

It will thus be appreciated that this invention at least in the form of the embodiments described provides a novel and unique form of musical score which greatly assists students in attaining greater accuracy and fluency in performance. Clearly however the example disclosed is only the currently preferred form of this invention and modifications may be made which would be apparent to a person skilled in music. For example other contrasting colour combinations or visual identification means may be used. Furthermore the application of this invention is not limited to the printed sheet and extends to any other form of reproduction such as computer displays, computer generated scores and any other electronic or mechanical device.

I claim:

1. A musical score in which the key and any accidentals are indicated by visual coding of the individual notes and associated components as they appear throughout said score, said visual coding including a set of contrasting chromatic colours, one of said chromatic colours being applied to those individual notes inflected with a sharp and another of said chromatic colours being applied to those individual notes inflected with a flat.

2. A method of teaching music which includes the step of instructing a student to recognize the key of a musical score by the visual coding of individual notes as they appear throughout said score, said visual coding including a set of contrasting chromatic colours, one of said chromatic colours being applied to those individual notes inflected with a sharp and another of said chromatic colours being applied to those individual notes inflected with a flat.

\* \* \* \* \*